(12) United States Patent
Vanneau

(10) Patent No.: US 8,933,403 B2
(45) Date of Patent: Jan. 13, 2015

(54) METHOD AND DEVICE FOR MEASUREMENT WITH AN IR IMAGING DEVICE

(75) Inventor: Emmanuel Vanneau, Paris (FR)

(73) Assignee: FLIR Systems AB, Taby (SE)

(*) Notice: Subject to any disclaimer, the term of this patent is extended or adjusted under 35 U.S.C. 154(b) by 321 days.

(21) Appl. No.: 13/525,024

(22) Filed: Jun. 15, 2012

(65) Prior Publication Data

US 2012/0318984 A1    Dec. 20, 2012

Related U.S. Application Data

(60) Provisional application No. 61/498,065, filed on Jun. 17, 2011.

(30) Foreign Application Priority Data

Jun. 17, 2011    (EP) .................................... 11170287

(51) Int. Cl.
*G01J 5/02*    (2006.01)
*G01J 5/00*    (2006.01)

(52) U.S. Cl.
CPC ............ *G01J 5/00* (2013.01); *G01J 2005/0077* (2013.01); *G01J 5/02* (2013.01)
USPC .................................................... 250/339.05

(58) Field of Classification Search
USPC .............................. 250/338.1, 339.01, 339.05
See application file for complete search history.

(56) References Cited

U.S. PATENT DOCUMENTS

| | | | |
|---|---|---|---|
| 3,456,111 | A | 7/1969 | Barnes et al. |
| 3,820,135 | A | 6/1974 | Dickson |
| 4,593,207 | A | 6/1986 | McRight, Jr. et al. |
| 2009/0065695 | A1 | 3/2009 | DeMarco et al. |
| 2010/0026713 | A1 | 2/2010 | Goto et al. |

FOREIGN PATENT DOCUMENTS

EP    1 203 962    5/2002

*Primary Examiner* — Mark R Gaworecki
(74) *Attorney, Agent, or Firm* — Haynes and Boone, LLP

(57) ABSTRACT

The present invention relates to a method and device for measuring at least two properties of an object, for some embodiments, said device comprising a measuring device for measuring at least one physical property of an object and an infrared imaging device for measuring at least one thermal property of an object, and wherein said first measuring device and said infrared imaging device are arranged to be synchronized to perform simultaneous measurements of the object.

30 Claims, 2 Drawing Sheets

METHOD AND DEVICE FOR MEASUREMENT WITH AN IR IMAGING DEVICE

CROSS-REFERENCE TO RELATED APPLICATIONS

This patent application claims priority to and the benefit of EP Patent Application No. 11170287, filed Jun. 17, 2011, and U.S. Provisional Patent Application No. 61/498,065, filed Jun. 17, 2011, which are incorporated herein by reference in their entirety.

TECHNICAL FIELD

The present invention relates to a device for measuring at least two properties of an object, said device comprising a first measuring device for measuring at least one physical property of an object and an infrared imaging device for measuring at least one thermal property of an object. The invention further relates to a method for measuring at least two properties of an object.

BACKGROUND

In many industrial applications, such as during manufacture of electronic components, it is important to supervise the production by measuring properties of the components, among others. Especially with regards to the design phase of electronic circuits, electronic properties are often measured to assure proper functioning of the components manufactured.

At present, such measurements are performed for instance by using an oscilloscope for monitoring electrical properties such as current, voltage or frequency of the components or circuits. A comprehensive analysis is, however, difficult to achieve using only these electrical properties, resulting in the risk for imperfections or errors in produced components or circuits. Such errors can severely decrease performance of products, resulting in the need for replacement or repair far earlier than would have been the case had all components been fully functional to begin with.

Other areas where improved measurements of properties of an object are desired are for instance when investigating load imbalances of a device or component, when detecting energy consumption and energy efficiency, or when finding defective areas of a material or analyzing a behavior of solar cells and the like to determine how they perform in a given situation.

There is therefore a need for performing a more versatile analysis of electronic components and circuits, both at a manufacturing stage and later as a troubleshooting tool for determining errors in a finished product.

RELATED ART

Prior art methods within the area are shown by U.S. Pat. No. 4,593,207, U.S. Pat. No. 3,456,111 and U.S. Pat. No. 3,820,135. None of these, however, disclose methods or devices suitable for a more comprehensive analysis of the properties of a specific object.

Another prior art device is shown by the SUSolution Analyzer device DF1100 produced by NEC. This device does not disclose a device suitable for a sufficiently thorough analysis of the properties of an object and does not enable a suitable presentation of measuring data to assess said properties.

SUMMARY

Embodiments of the present invention eliminate or at least minimize the problems described above. This is achieved through devices, methods, and arrangements according to the appended claims. For example, for an embodiment, a first measuring device and an infrared imaging device are arranged to simultaneously measure at least one physical property and a temperature of an object. Thereby, a more comprehensive analysis of an object can be performed, relating a temperature of the object to a physical property measured at the same time. Thanks to the combination and timing of measurements, a temperature corresponding in time to a specific physical property can be determined, giving a more comprehensive image of the thermal response of the component or circuit to the application of a voltage or current, for instance.

Depending on the properties of an object to be analyzed or on the properties of the first measuring device and infrared imaging device, a synchronizing system can use a suitable trigger rate from any of the measuring devices, i.e. the first measuring device and the IR imaging device, to determine when measurements are to be performed at each of the measuring devices, and data can be stored in such a way that a correlation between their timing can be recorded. Thereby, according to embodiments, a natural clock rate of an infrared (IR) imaging device can be used to synchronize measuring of the physical property recorded by a first measuring device, or vice versa, allowing for a precise matching of the thermal behavior with the physical behavior.

According to an embodiment, there is provided an arrangement for analyzing an object by measuring at least two properties of said object, said arrangement comprising an infrared system, or infrared imaging device, for measuring at least one thermal property of said object and a measuring device for measuring at least one physical property of said object, said physical property being represented by an electrical signal. According to a further embodiment, said arrangement further comprises a synchronizing system that is arranged to synchronize an operation of said infrared system/infrared imaging device and said measuring device in such a way that said measuring device and said infrared system/infrared imaging device each perform a measurement of a property of said object at a time determined by said synchronizing system, wherein one of the infrared system/infrared imaging device and the measuring device acts as a master unit and the other of the two devices acts as a slave unit, and wherein the master unit controls the measurements performed by the slave unit through the synchronizing system.

According to an embodiment, there is provided a method for analyzing an object by measuring at least two properties of said object, comprising measuring a thermal property of said object using an infrared system/infrared imaging device, measuring at least one physical property of said object using a measuring device, said physical property being represented as an electrical signal, wherein the method further comprises synchronizing the measurements of said measuring steps using a synchronizing system in such a way that said measuring device and said infrared system/infrared imaging device each perform a measurement of a property of said object at a time determined by said synchronizing system, wherein said synchronizing comprises receiving in said synchronizing system a control signal from a master unit, the master unit being one of the infrared system/infrared imaging device and the measuring device, and controlling the measurements performed by a slave unit, the slave unit being the other of the two devices, based on said control signal.

According to an embodiment, there is provided an infrared system/infrared imaging device for measuring at least one thermal property of an object, said infrared system/infrared imaging device being coupled to a measuring device for measuring at least one physical property of said object, said physical property being represented by an electrical signal, said measurements from the infrared system/infrared imaging device and the measuring device being used for analyzing the object. According to a further embodiment, said infrared system/infrared imaging device further comprises or is coupled to a synchronizing system that is arranged to synchronize an operation of said infrared system/infrared imaging device and said measuring device in such a way that said measuring device and said infrared system/infrared imaging device each perform a measurement of a property of said object at a time determined by said synchronizing system, wherein said synchronizing system is configured to receive a control signal from a master unit, the master unit being one of the infrared system/infrared imaging device and the measuring device, and controlling the measurements performed by a slave unit, the slave unit being the other of the two devices, based on said control signal.

According to an embodiment, there is provided a measuring device for measuring at least one physical property of an object, said physical property being represented by an electrical signal, said measuring device being coupled to an infrared system/infrared imaging device for measuring at least one thermal property of said object, said measurements from the infrared system/infrared imaging device and the measuring device being used for analyzing the object. According to a further embodiment, said measuring device further comprises or is coupled to a synchronizing system that is arranged to synchronize an operation of said infrared system/infrared imaging device and said measuring device in such a way that said measuring device and said infrared system/infrared imaging device each perform a measurement of a property of said object at a time determined by said synchronizing system, wherein said synchronizing system is configured to receive a control signal from a master unit, the master unit being one of the infrared system/infrared imaging device and the measuring device, and controlling the measurements performed by a slave unit, the slave unit being the other of the two devices, based on said control signal.

According to an embodiment, there is provided a synchronization system configured to synchronize an operation of an infrared system/infrared imaging device, for measuring at least one thermal property of an object, and a measuring device, for measuring at least one physical property of said object, said physical property being represented by an electrical signal, wherein the measurements from the infrared system/infrared imaging device and the measuring device are used for analyzing the object, said synchronizing system being configured to synchronize the operation of said measuring device and said infrared system/infrared imaging device in such a way that said measuring device and said infrared system/infrared imaging device each perform a measurement of a property of said object at a time determined by said synchronizing system, wherein said synchronizing system is further configured to receive a control signal from a master unit, the master unit being one of the infrared system/infrared imaging device and the measuring device, and to control the measurements performed by a slave unit, the slave unit being the other of the two devices.

Further advantages and benefits of embodiments of the invention will become readily apparent to the person skilled in the art in view of the detailed description below.

BRIEF DESCRIPTION OF THE DRAWINGS

Embodiments of the invention will now be described in more detail with reference to the appended drawings, wherein.

DETAILED DESCRIPTION

Figure 1:
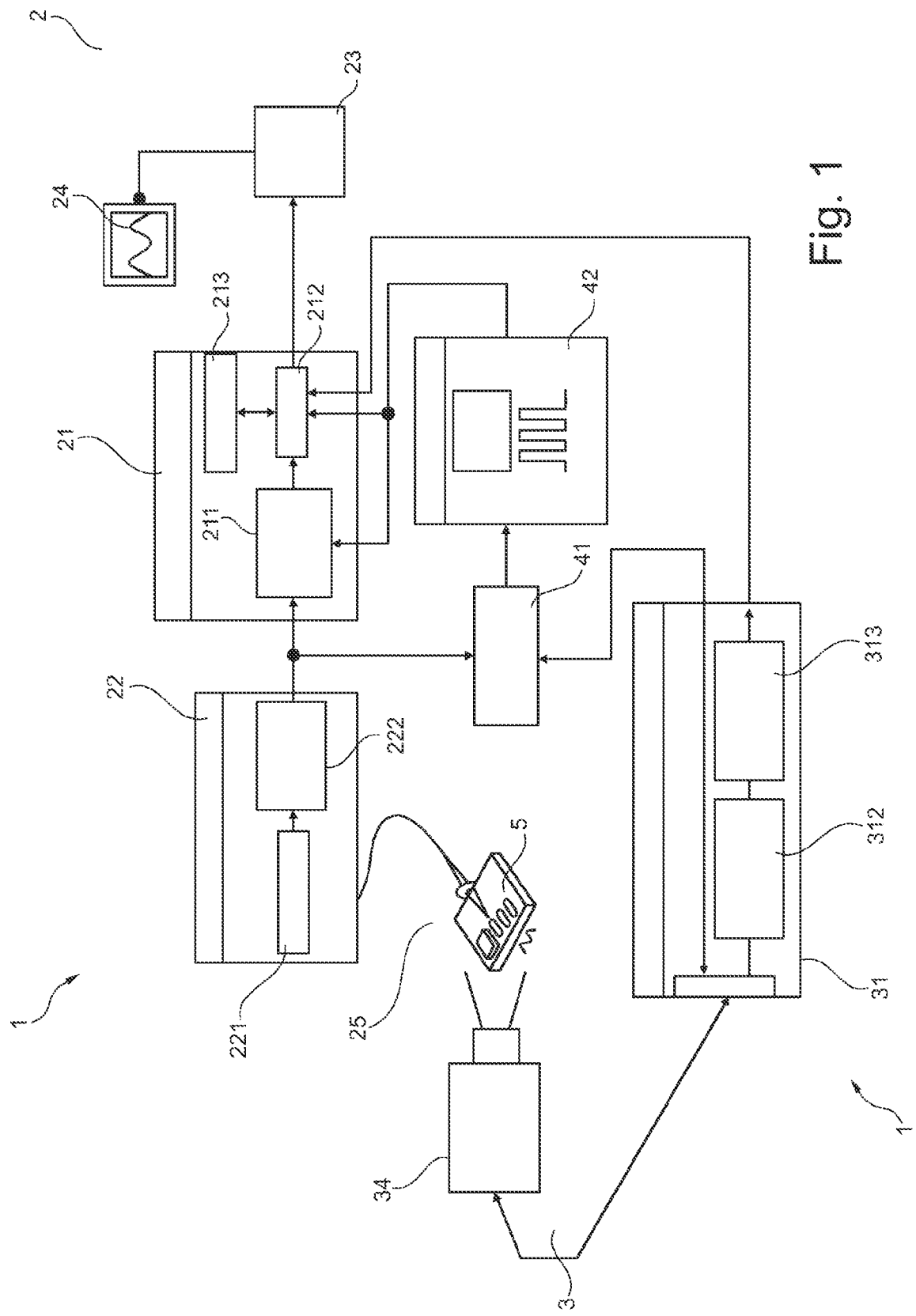
FIG. 1 shows a schematic view of a measuring device according to an embodiment.

FIG. 1 shows a measuring device 1, or arrangement 1, for analyzing an object 5 in accordance with one or more embodiments. According to an embodiment of the invention, the measuring device or arrangement 1 comprises a measuring device 2, for instance in the form of an oscilloscope arranged to perform electronic measurements by means of a probe 25, and an infrared (IR) imaging device 3, for instance in the form of an IR system, arranged to perform electronic measurements by means of an IR imaging device 34. According to embodiments, the measuring device 2 and the IR system/IR imaging device 3 are used for measuring properties of an object 5. The probe 25 is equipped with a sensor/detector arranged to perform a measurement and transfer measurement data in the form of an electrical signal from said sensor/detector to said measuring device 2 by means of the probe 25. According to an embodiment, all the parts of the IR system 3, further described below in connection with FIG. 1, are comprised in an IR imaging device 34, such as for instance an IR camera. Thereby, hereinafter the terms IR system and IR imaging device may according to some embodiments be used interchangeably. According to an embodiment, the measuring device 1, or arrangement 1, further comprising a memory unit 212 for storing measurements from said measuring device 2 and said infrared system 3 together with information allowing measurements taken simultaneously to be identified.

According to an embodiment, there is provided an arrangement 1 for analyzing an object 5 by measuring at least two properties of said object 5, said arrangement comprising an infrared system/infrared imaging device 3 for measuring at least one thermal property of said object 5, and a measuring device 2 for measuring at least one physical property of said object 5, said physical property being represented by an electrical signal. According to a further embodiment, said arrangement 1 further comprises a synchronizing system 41 that is arranged to synchronize an operation of said infrared system/infrared imaging device 3 and said measuring device 2 in such a way that said measuring device 2 and said infrared system/infrared imaging device 3 each perform a measurement of a property of said object 5 at a time determined by said synchronizing system 41, wherein one of infrared system/infrared imaging device 3 and the measuring device 2 acts as a master unit and the other of the two devices acts as a slave unit, and wherein the master unit controls the measurements performed by the slave unit through the synchronizing system 41.

According to an embodiment, the infrared system/infrared imaging device 3 is arranged to transmit a control signal to the synchronizing system 41, whereby the synchronization system 41 controls the frequency and/or timing of measurements to be performed by the measuring unit 2 based on said control signal. According to an alternative embodiment, the measuring unit 2 is arranged to transmit a control signal to the synchronizing system 41, whereby the synchronization system 41 controls the frequency and/or timing of measurements to be performed by the infrared system/infrared imaging device 3 based on said control signal.

According to an embodiment, there is provided an infrared system/infrared imaging device 3, 34 for measuring at least one thermal property of an object 5, said infrared system/infrared imaging device 3, 34 being coupled to a measuring device 2 for measuring at least one physical property of said object 5, said physical property being represented by an electrical signal, said measurements from the infrared system/infrared imaging device 3 and the measuring device 2 being used for analyzing the object 5. According to a further embodiment, said infrared system/infrared imaging device 3, 34 further comprises or is coupled to a synchronizing system 41 that is arranged to synchronize an operation of said infrared system/infrared imaging device 3, 34 and said measuring device 2 in such a way that said measuring device 2 and said infrared system/infrared imaging device 3, 34 each perform a measurement of a property of said object 5 at a time determined by said synchronizing system 41, wherein said synchronizing system 41 is configured to receive a control signal from a master unit, the master unit being one of infrared system/infrared imaging device 3, 34 and the measuring device 2, and controlling the measurements performed by a slave unit, the slave unit being the other of the two devices, based on said control signal 41. According to an embodiment, the infrared system/infrared imaging device 3, 34 is arranged to transmit a control signal to the synchronizing system 41, whereby the synchronization system 41 controls the frequency and/or timing of measurements to be performed by the measuring unit 2 based on said control signal. According to an embodiment, the infrared system/infrared imaging device 3, 34 is configured to be controlled by said synchronizing system 41 with regards to the frequency and/or timing of measurements to be performed by the infrared imaging device 34.

According to an embodiment, there is provided a measuring device 2 for measuring at least one physical property of an object 5, said physical property being represented by an electrical signal, said measuring device 2 being coupled to an infrared system/infrared imaging device 3 for measuring at least one thermal property of said object 5, said measurements from the infrared system/infrared imaging device 3 and the measuring device 2 being used for analyzing the object 5. According to a further embodiment, said measuring device 2 further comprises or is coupled to a synchronizing system 41 that is arranged to synchronize an operation of said infrared system/infrared imaging device 3 and said measuring device 2 in such a way that said measuring device 2 and said infrared system/infrared imaging device 3 each perform a measurement of a property of said object 5 at a time determined by said synchronizing system 41, wherein said synchronizing system 41 is configured to receive a control signal from a master unit, the master unit being one of infrared system/infrared imaging device 3 and the measuring device 2, and controlling the measurements performed by a slave unit, the slave unit being the other of the two devices, based on said control signal 41. According to an embodiment, the measuring unit 2 is arranged to transmit a control signal to the synchronizing system 41, whereby the synchronization system 41 controls the frequency and/or timing of measurements to be performed by the infrared system 3 based on the control signal. According to an embodiment, the measuring device 2 is configured to be controlled by the synchronizing system 41 with regards to the frequency and/or timing of measurements to be performed by the measurement device 2.

According to an embodiment, the measuring device 2 is further configured to receive an electrical signal from a sensor/detector by means of a probe 25. According to an embodiment, the measuring device 2 is an oscilloscope. According to this embodiment, the oscilloscope 2 comprises a vertical system 22 connected to the probe 25 and receiving signals from it, and is arranged to process said signals by means of an attenuator 221 and a vertical amplifier 222 to achieve signals more suitable for display and storage. The vertical system 22 is also connected to an acquisition system 21 for receiving signals, converting them from analogue to digital signals in a converter 211 and storing in a memory unit 212. A processing unit 213 is also provided for interacting with the memory unit 212 to further process the digital signals in suitable ways and storing processed signals after such procedure. The probe 25 is arranged to measure at least one physical property of the object 5 and to represent said physical property by means of an electric signal that can be transferred to the measuring device 2. The physical property can be an electrical property, such as a current or voltage for instance, but can also be a property such as a pressure, speed, or rotational velocity. In some embodiments, the probe 25 can be arranged to perform measurements of more than one physical property depending on the situation, but in other embodiments it may be more advantageous to provide a plurality of probes 25 to measure different physical properties as is deemed suitable.

According to an embodiment, a synchronizing system 41 for synchronizing operation of the device 1, or arrangement 1, is connected to the vertical system 22 to receive input and to process these further in a horizontal system 42, giving input to the converter 211 and the memory unit 212.

According to an embodiment, there is provided a synchronization system 41 configured to synchronize an operation of an infrared system/infrared imaging device 3, for measuring at least one thermal property of an object 5, and a measuring device 2, for measuring at least one physical property of said object 5, said physical property being represented by an electrical signal, wherein the measurements from the infrared system/infrared imaging device 3 and the measuring device 2 are used for analyzing the object 5, said synchronizing system 41 being configured to synchronize the operation of said measuring device 2 and said infrared system/infrared imaging device 3 in such a way that said measuring device 2 and said infrared system/infrared imaging device 3 each perform a measurement of a property of said object 5 at a time determined by said synchronizing system 41, wherein said synchronizing system 41 is further configured to receive a control signal from a master unit, the master unit being one of the infrared system/infrared imaging device 3 and the measuring device 2, and to control the measurements performed by a slave unit, the slave unit being the other of the two devices. According to an embodiment, the synchronizing system 41 is configured to receive a control signal from the infrared system 3, and further to control the frequency and/or timing of measurements to be performed by the measuring unit 2 based on the control signal. According to an alternative embodiment, the synchronizing system 41 is configured to receive a control signal from said measuring unit 2, and further to control the frequency and/or timing of measurements to be performed by the infrared system 3 based on said control signal.

According to an embodiment, the IR system 3 comprises an IR imaging device 34 for performing temperature measurements of the object 5 and transmitting signals, for instance in the form of thermal images, to an image acquisition unit 312 and image processing unit 313 mounted in an imaging device system 31. Said imaging device system 31 is also connected to the memory unit 212 for storing and processing IR images in a manner similar to that for electrical data captured by the probe 25 and processed by the oscilloscope 2, and to the synchronizing system 41. According to an embodiment, the imaging device system 31 is integrated in the IR imaging device 34. According to an alternative embodiment, the imaging device system 31 is external to and communicatively coupled to the IR imaging device 34.

For displaying captured data to a user of the system, there may be provided a digital display system 23 in connection with the memory unit 212, and further a display unit 24, where data can be shown in the form of graphs, images or other suitable representations.

It is to be noted that other instruments can be used in the place of the oscilloscope 2 as a measuring device 2. For instance, a multimeter tool, data logger or other instrument with a recording device suitable for measuring physical properties can be used, or a plurality of different instruments measuring different physical properties.

The operation of the measuring device 1, or arrangement 1, will now be described.

An object 5 to be measured is placed in a suitable location where both the infrared imaging device 34 and the probe 25 can be used. According to an embodiment, an electrical signal is transferred from a sensor or detector to the measuring device 2 by means of the probe 25. A user can interact with a man-machine interface (not shown) to determine which physical property is to be measured by the probe 25, control parameters relating to the operation of the infrared imaging device 34, and if desired a clock rate used with the synchronizing system 41 for timing the measurements.

In order for the probe 25 to measure an electrical property, for instance, a current or voltage with suitable properties can be applied and a reaction to this application by the object 5 can be recorded by the probe 25 and transmitted in the form of a plurality of signals to the vertical system 22, where the signals may be processed and amplified in order to be more easily analyzed and viewed at later stages.

Simultaneously, the infrared imaging device 34 may detect thermal energy emitted from the object 5 to form a series of infrared images or other data corresponding to a temperature measurement, and transmitting said images or other data in the form of signals to the imaging device system 31.

The synchronizing system 41 controls the frequency and/or timing of measurements to be recorded by the measurement device 1 so that from a continuous stream of signals relating to a physical property or a temperature signals can be selected that have been recorded at a specific point in time. Such signals can constitute a pair of signals and be stored by the memory unit 212 for simultaneous display in the display unit 24.

According to embodiments, the synchronization performed by the synchronizing system 41 can be performed differently depending on, among others, the object 5 to be measured, properties of the measuring device 2, properties of the infrared imaging device 3, or display and calculation preferences by the user of the system.

Figure 3:
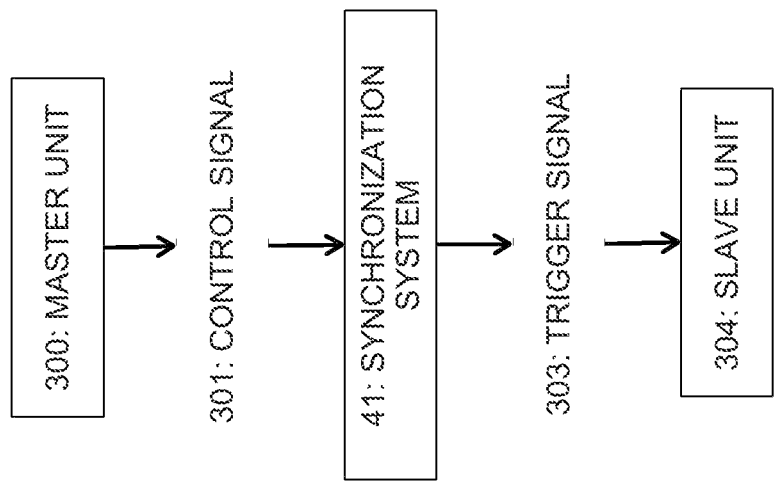
FIG. 3 is a block diagram representing synchronization according to alternative embodiments.
Figure 2:
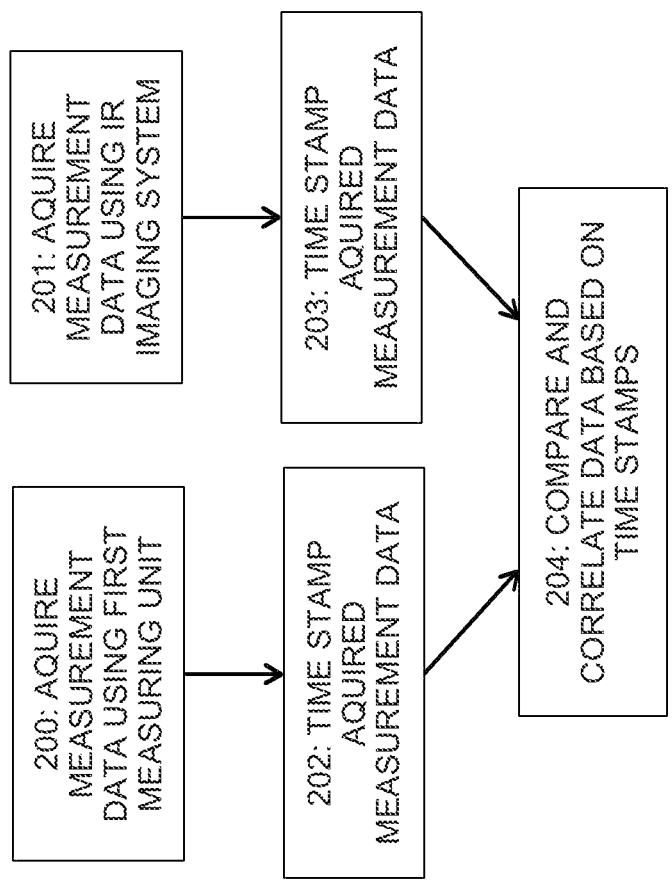
FIG. 2 is a block diagram representing synchronization according to an embodiment.

FIG. 2 and FIG. 3 relate to synchronization of measurements, wherein the measurements that are to be synchronized, in order to be performed simultaneously, comprise: measurements of at least one physical property of an object (5), said physical property being represented by an electrical signal; and measurements of a thermal property of the same object (5).

FIG. 3 shows a block diagram representing synchronization according to alternative embodiments wherein one of two measuring device acts as a master unit 300, and a slave unit 304. The two measuring devices may for instance be the measuring device 2 and the second measuring device 3, wherein either measuring device may act as the master unit 300 or the slave unit 304 according to different embodiments. The master unit 300 controls the measurements performed by the slave unit 304 by transmitting a control signal 301 to the synchronizing system 41, whereby the synchronization system 41 processes the received control signal 301 and transmits a trigger signal 303 to the slave unit 304, the trigger signal indicating the frequency and/or timing of measurements to be performed by the slave unit 304, in order for the measurements of the slave unit 304 to be performed simultaneously with the measurements of the master unit 300.

According to an embodiment, there is provided a method for analyzing an object 5 by measuring at least two properties of said object 5, comprising measuring a thermal property of said object 5 using an infrared imaging device 3, measuring at least one physical property of said object 5 using a measuring device 2, said physical property being represented as an electrical signal, wherein the method further comprises synchronizing the measurements of said measuring steps using a synchronizing system 41 in such a way that said measuring device 2 and said infrared imaging device 3 each perform a measurement of a property of said object 5 at a time determined by said synchronizing system 41, wherein said synchronizing comprises receiving in said synchronizing system 41 a control signal from a master unit, the master unit being one of infrared imaging device 3 and the measuring device 2, and controlling the measurements performed by a slave unit, the slave unit being the other of the two devices, based on said control signal 41. According to an embodiment, the control signal is based on a periodic signal of said measuring device 2. The method according to this embodiment may further comprise selecting said periodic signal to correspond to a suitable frame rate of an infrared imaging device 34 comprised in the infrared system 3. According to an alternative embodiment, the control signal is based on a frame rate of an infrared imaging device 34 comprised in said infrared system 3. According to an alternative embodiment, the method may further comprise receiving measurements at suitable rates from the measuring device 2 and the infrared systems 3, and time stamping said measurements to display a correlation between the measurements of the measuring device (2) and the measurements of the infrared system 3.

According to an embodiment, synchronizing comprises receiving in the synchronizing system 41 a control signal from said infrared imaging device 3, whereby the synchronization system 41 controls the frequency and/or timing of measurements to be performed by the measuring unit 2 based on said control signal. According to an alternative embodiment, synchronizing comprises receiving in the synchronizing system 41 a control signal from said measuring unit 2, whereby the synchronization system 41 controls the frequency and/or timing of measurements to be performed by the infrared imaging device 3 based on said control signal.

Alternative embodiments of this synchronization method are presented below in embodiments 1, 2 and 3.

In a first beneficial embodiment, the synchronization is dependent on a periodic signal in the measuring device 2, for instance an oscilloscope. According to an embodiment, the synchronizing system 41 is arranged to use a periodic signal of the measuring device 2 for periodically obtaining a measurement from the measuring device 2 and the infrared system 3. Hence, the measuring device 2 acts as the master unit 300 and the periodic signal is transmitted as a control signal 301 to the synchronization system 41. The infrared imaging device in the form of an IR system 3 acts as a slave unit 304 to the measuring device 2. Thus, when a periodic signal reaches a specified value, such as a peak value for instance, a trigger signal 303 is sent from the synchronization system 41 to create an image at the IR system 3. The image is recorded together with a simultaneous measurement of the measuring device 2. Generally, the measuring device 2 gives an analogue signal of the measurements performed but only data corresponding to the time of the determined point on the periodic signal is stored, together with the image of the IR system 3 at that time.

This is especially suitable where the IR system 3 comprises a high-end imaging device 34, which generally gives the opportunity to have the imaging device 34 controlled by a periodicity given by another device such as an oscilloscope 2. The measuring rate can in this embodiment be chosen to match an electrical behavior of the object 5, such as for instance a frequency to be measured, and the infrared imaging device 34 can be matched to this rate. According to an embodiment, the periodic signal is adapted to a frame rate of the infrared imaging device (34) comprised in said infrared system (3).

In the event that the imaging device 34 is of a more conventional type, a second beneficial embodiment can be used wherein the synchronizing system 41 allows a frame rate of the IR imaging device 34 to control the measurements of the measuring device 2. According to an embodiment, the synchronizing system 41 is arranged to use a frame rate of an infrared imaging device 34 comprised in said infrared system 3 for obtaining a measurement from the measuring device 2 and the infrared imaging device 3. In other words, the IR system 3 acts as the master unit 300 according to this embodiment, and the control signal 301 transmitted to the synchronization system 41 is represented as the frame rate of the IR imaging device 34. In this embodiment, the imaging device 34 collects a series of images at a suitable frame rate, and the synchronizing system 41 synchronizes the measuring device 2 by transmitting a trigger signal 303 to acquire a measurement corresponding to the time instance when each of these images is captured. Thus, the measuring device 2 is a slave to the IR system 3 and only one analogue data point is created for each image from the IR system 3.

In a third beneficial embodiment, to a certain extent similar to the second beneficial embodiment described above, the frame rate of the IR imaging device 34 is used by the synchronizing system 41 to determine a data acquisition rate of the device 1. In other words the IR system acts as the master unit 300 that transmits a control signal 301 in the form of the frame rate of the IR imaging device 34 to the synchronization system 41, and the measuring device acts as the slave unit 304. The synchronization unit 41 further transmits a trigger signal 303 based on the received control signal 301 to the slave unit 304. In this embodiment, an acquisition clock is created for the measuring device 2 with a clock rate corresponding to the frame rate of the imaging device 34. A trigger signal 303 is transmitted to the IR imaging device 34 to acquire measurement data (capture images) at a rate corresponding to the clock rate of the acquisition clock. Thus the device 2 and infrared imaging device 3 work independently with separate triggers but at the same clock rate or frame rate for the acquisition of measurements. The imaging device 34 is thereby determining and limiting the rates that are suitable in this embodiment, but a number of analogue data points can be created by the measuring device 2 for each of the images created by the imaging device 34.

In these second and third embodiments, it is a thermal behavior of the object 5 rather than a physical behavior that determines when it is suitable to perform the measurement, and the data from the measuring device 2, for instance an oscilloscope, serve to display the physical properties corresponding to these thermal properties.

In a fourth embodiment, a time stamping synchronization can be used, where the synchronizing system 41 allows both the measuring device 2 and the IR system 3 to measure data and records the timing of each measurement. This embodiment is shown in FIG. 2. According to this embodiment, none of the devices acts as a master unit 300. Instead, in this embodiment, each image acquired 201 by the IR system 3 is stored together with a time stamp 203 identifying when the image was created and in parallel analogue data points acquired 200 by the measuring device 2 are stored and time stamped 202, to display a correlation between the measurements of the measuring device 2 and the measurements of the infrared imaging device 3. The time stamped measurement data from both measurement devise 2,3 are received in the synchronization system 41, where the time stamps are compared based on the time stamp information in order to find correlation 204 between the measurement data from both devices 2, 3. Thus, the correlation between an image and the analogue data points created at approximately the same time is smaller than by the other embodiments described above, and an interpolation of the analogue signal may be required to determine a measurement of the measuring device 2 at precisely the time instance when a particular image was created.

Thus, there are a number of possibilities of achieving the synchronization of measurements at the measuring device 2 and infrared imaging device 3. Generally, the embodiments described above differ in the amount of analogue data captured by the measuring device 2 for each image from the IR system 3. Depending on the application where the device 1 is used, it may be more suitable to collect a higher amount of analogue data, or it may conversely be more suitable to achieve a very high correlation between the timing of the measurements of the measuring devices 2, 3 and thus have only one data point for each image. Other adaptations within the scope of the claims are of course also readily apparent to the person skilled in the art. As a result, a comprehensive analysis of a physical and a thermal behavior of the object 5 can be achieved.

After data has thus been captured from the measuring device 2 and infrared imaging device 3, an analysis can be performed in the processing unit 213 of the device 1 to evaluate properties and performance of the object 5 during the measurements. The images and data points can also be displayed in a combined way in the display 24 for viewing by the user, allowing her or him to analyze the object 5 and to perform suitable tests to view its physical and thermal properties as desired. To display the measured data together is advantageous in that it allows the user to assess the properties of an object and the correlation and combined impact of the different measured properties easily, and to achieve and maintain an overview of the measuring as well as the object being measured.

Data can also be extracted from the memory unit 212 to a separate processing unit (not shown) for further analysis.

The invention is not to be seen as limited by the preferred embodiments described above, but can be varied within the scope of the appended claims, as will become readily apparent to the person skilled in the art.

The invention claimed is:

1. An arrangement configured to analyze an object by measuring at least two properties of said object, said arrangement comprising:

an infrared system configured to measure at least one thermal property of said object, and a measuring device configured to measure at least one physical property of said object, said physical property being represented by an electrical signal, wherein, said arrangement further comprises a synchronizing system that is arranged to synchronize an operation of said infrared system and said measuring device in such a way that said measuring device and said infrared system each perform a measurement of a property of said object at a time determined by said synchronizing system, wherein one of the infrared system and the measuring device is configured to operate as a master unit and the other of the infrared system and the measuring device is configured to operate as a slave unit, and wherein the master unit controls the measurements performed by the slave unit through the synchronizing system.

2. The arrangement of claim 1, wherein said infrared system is arranged to transmit a control signal to the synchronizing system, whereby the synchronization system controls the frequency and/or timing of measurements to be performed by the measuring unit based on said control signal.

3. The arrangement according to claim 2, wherein said synchronizing system is arranged to use a frame rate of an infrared imaging device comprised in said infrared system for obtaining a measurement from said measuring device and said infrared imaging device.

4. The arrangement of claim 1, wherein said measuring device is arranged to transmit a control signal to the synchronizing system, whereby the synchronization system controls the frequency and/or timing of measurements to be performed by the infrared system based on said control signal.

5. The arrangement according to claim 4, wherein said synchronizing system is arranged to use a periodic signal of said measuring device for periodically obtaining a measurement from said measuring device and said infrared system.

6. The arrangement according to claim 5, wherein said periodic signal is adapted to a frame rate of an infrared imaging device comprised in said infrared system.

7. The arrangement according to claim 1, wherein said electrical signal is arranged to be transferred from a sensor/detector to said measuring device by means of a probe.

8. The arrangement of claim 1, wherein said physical property is a selection of any of the following:
   electrical property,
   pressure,
   speed, and/or
   rotational velocity.

9. The arrangement according to claim 1, wherein said measuring device is an oscilloscope.

10. The arrangement according to claim 1, wherein said arrangement is arranged to receive measurements at suitable rates from said measuring device and said infrared system, and wherein said measurements from said measuring device and said infrared system are time stamped to display a correlation between the measurements of the measuring device and the measurements of the infrared system.

11. The arrangement according to claim 1, further comprising a memory unit for storing measurements from said measuring device and said infrared system together with information allowing measurements taken simultaneously to be identified.

12. A method for analyzing an object by measuring at least two properties of said object, the method comprising:
    measuring a thermal property of said object using an infrared system,
    measuring at least one physical property of said object using a measuring device, said physical property being represented as an electrical signal,
    wherein the method further comprises:
    synchronizing the measurements of said measuring steps using a synchronizing system in such a way that said measuring device and said infrared system each perform a measurement of a property of said object at a time determined by said synchronizing system,
    wherein said synchronizing comprises receiving in said synchronizing system a control signal from a master unit, the master unit being one of the infrared system and the measuring device, and controlling the measurements performed by a slave unit, the slave unit being the other of the infrared system and the measuring device, based on said control signal.

13. The method of claim 12, wherein said synchronizing comprises receiving in said synchronizing system a control signal from said infrared system, whereby the synchronization system controls the frequency and/or timing of measurements to be performed by the measuring unit based on said control signal.

14. The method of claim 13, further comprising selecting said periodic signal to correspond to a suitable frame rate of an infrared imaging device comprised in said infrared system.

15. The method of claim 13, wherein said control signal is based on a frame rate of an infrared imaging device comprised in said infrared system.

16. The method of claim 12, wherein said synchronizing comprises receiving in said synchronizing system a control signal from said measuring device whereby the synchronization system controls the frequency and/or timing of measurements to be performed by the infrared system based on said control signal.

17. The method of claim 16, wherein said control signal is based on a periodic signal of said measuring device.

18. The method of claim 12, wherein said electrical signal is transferred from a sensor or detector to said measuring device by means of a probe.

19. The method of claim 12, further comprising receiving measurements at suitable rates from said measuring device and said infrared systems, and time stamping said measurements to display a correlation between the measurements of the measuring device and the measurements of the infrared system.

20. An infrared imaging device configured to measure at least one thermal property of an object, the infrared imaging device comprising:
    said infrared imaging device being coupled to a measuring device configured to measure at least one physical property of said object, said physical property being represented by an electrical signal,
    said measurements from the infrared imaging device and the measuring device being used for analyzing the object, wherein,
    said infrared imaging device further comprises or is coupled to a synchronizing system that is arranged to synchronize an operation of said infrared imaging device and said measuring device in such a way that said measuring device and said infrared imaging device each perform a measurement of a property of said object at a time determined by said synchronizing system, and
    wherein said synchronizing system is configured to receive a control signal from a master unit, the master unit being one of the infrared imaging device and the measuring device, and controlling the measurements performed by a slave unit, the slave unit being the other of the infrared imaging device and the measuring device, based on said control signal.

21. The infrared imaging device of claim 20, wherein said infrared imaging device is arranged to transmit a control signal to the synchronizing system, whereby the synchronization system controls the frequency and/or timing of measurements to be performed by the measuring device based on said control signal.

22. The infrared imaging device of claim 20, wherein said infrared imaging device is configured to be controlled by said synchronizing system with regards to the frequency and/or timing of measurements to be performed by the infrared imaging device.

23. A measuring device configured to measure at least one physical property of an object, said physical property being represented by an electrical signal, the measuring device comprising:
   said measuring device being coupled to an infrared system configured to measure at least one thermal property of said object,
   said measurements from the infrared system and the measuring device being used for analyzing the object, wherein,
   said measuring device further comprises or is coupled to a synchronizing system that is arranged to synchronize an operation of said infrared system and said measuring device in such a way that said measuring device and said infrared system each perform a measurement of a property of said object at a time determined by said synchronizing system,
   wherein said synchronizing system is configured to receive a control signal from a master unit, the master unit being one of the infrared system and the measuring device, and controlling the measurements performed by a slave unit, the slave unit being the other of the infrared system and the measuring device, based on said control signal.

24. The measuring device of claim 23, wherein said measuring device is arranged to transmit a control signal to the synchronizing system, whereby the synchronization system controls the frequency and/or timing of measurements to be performed by the infrared system based on said control signal.

25. The measuring device of claim 23, wherein said measuring device is configured to be controlled by said synchronizing system with regards to the frequency and/or timing of measurements to be performed by the measurement device.

26. The measuring device according to claim 23, wherein said measuring device is further configured to receive said electrical signal from a sensor/detector by means of a probe.

27. The measuring device according to claim 23, wherein said measuring device is an oscilloscope.

28. A synchronization system configured to synchronize an operation of an infrared system configured to measure at least one thermal property of an object, and a measuring device configured to measure at least one physical property of said object, said physical property being represented by an electrical signal, wherein the measurements from the infrared system and the measuring device are used for analyzing the object, the synchronization system comprising:
   said synchronizing system being configured to synchronize the operation of said measuring device and said infrared system in such a way that said measuring device and said infrared system each perform a measurement of a property of said object at a time determined by said synchronizing system, and
   wherein said synchronizing system is further configured to receive a control signal from a master unit, the master unit being one of the infrared system and the measuring device, and to control the measurements performed by a slave unit, the slave unit being the other of the infrared system and the measuring device.

29. The synchronizing system of claim 28, wherein said synchronizing system is configured to receive a control signal from said infrared system, and further to control the frequency and/or timing of measurements to be performed by the measuring unit based on said control signal.

30. The synchronizing system of claim 28, wherein said synchronizing system is configured to receive a control signal from said measuring device, and further to control the frequency and/or timing of measurements to be performed by the infrared system based on said control signal.

* * * * *